(12) United States Patent
Reinpold

(10) Patent No.: US 9,365,192 B2
(45) Date of Patent: Jun. 14, 2016

(54) BRAKING SYSTEM FOR SUPPLEMENTAL OR EMERGENCY USE

(71) Applicant: Philip C. Reinpold, Pueblo West, CO (US)

(72) Inventor: Philip C. Reinpold, Pueblo West, CO (US)

( * ) Notice: Subject to any disclaimer, the term of this patent is extended or adjusted under 35 U.S.C. 154(b) by 104 days.

(21) Appl. No.: 14/489,283

(22) Filed: Sep. 17, 2014

(65) Prior Publication Data

US 2015/0127238 A1    May 7, 2015

Related U.S. Application Data

(60) Provisional application No. 61/900,441, filed on Nov. 6, 2013.

(51) Int. Cl.
*B60T 1/06* (2006.01)
*B60T 13/74* (2006.01)
*F16H 1/10* (2006.01)
*F16H 1/22* (2006.01)

(52) U.S. Cl.
CPC ............ *B60T 1/062* (2013.01); *B60T 13/746* (2013.01); *F16H 1/10* (2013.01); *F16H 1/227* (2013.01)

(58) Field of Classification Search
CPC ......... B60T 1/062; B60T 13/746; F16H 1/10; F16H 1/227
See application file for complete search history.

(56) References Cited

U.S. PATENT DOCUMENTS

| | | | |
|---|---|---|---|
| 7,347,304 B2 * | 3/2008 | Nilsson | B60T 13/741 188/1.11 E |
| 9,127,752 B2 * | 9/2015 | Kullin | F16H 1/32 |
| 2015/0204399 A1 * | 7/2015 | Schmidt | B60K 7/0007 188/161 |

* cited by examiner

*Primary Examiner* — Todd Melton

(57) ABSTRACT

A braking system for supplemental or emergency use in conjunction with traditional braking methods increases resistance of the rotation of a wheel of a moving vehicle. The braking system for supplemental or emergency use slows the vehicle down more quickly and safely than traditional braking means through the use of a speed limiting module which is connected to a wheel braking interface, such as a brake rotor or disc. The speed limiting module includes a control system that controls the rotation of the wheel braking interface using a variable rotational resistance (VRR) mechanism. The VRR mechanism applies a counter rotational force onto a gear shaft which is attached to a pinion disposed on the opposite end of the gear shaft. The pinion meshes with a plurality of internal cogs positioned on the wheel braking interface. The counter rotational force from the pinion assists in slowing the rotation of the wheel.

19 Claims, 11 Drawing Sheets

BRAKING SYSTEM FOR SUPPLEMENTAL OR EMERGENCY USE

The current application claims a priority to the U.S. Provisional Patent application Ser. No. 61/900,441 filed on Nov. 6, 2013.

FIELD OF THE INVENTION

The present invention relates generally to a supplemental braking system for vehicles. More specifically, the present invention is an apparatus that slows the rotation of a brake disc rotor or brake drum. The present invention allows for a vehicle to slow down much safer and quicker than traditional disc or drum brakes when engaged.

BACKGROUND OF THE INVENTION

There are many instances when a vehicle may need to stop in a very short amount of distance. This could be a train needing to stop very short to avoid an obstacle. It could also be a runaway truck on a mountain road or automobile requiring a very little stopping distance. Another example of a vehicle that could require a short stopping distance is an aircraft. Aircraft that land at very short fields, grass strips, or remote areas need the maximum amount of stopping force to prevent overrunning the runway. Additionally, airplanes in emergencies sometimes need to make a very short off field landing. In an engine out emergency the pilot needs to land the plane in the nearest open space, many times being a field. In these emergency situations, there is a limited amount of space that the pilot can utilize to stop the aircraft to avoid damage to the aircraft and injury to himself and to passengers.

Currently, airplanes use both single and multiple pack disc brakes to slow down, and many also employ aerodynamic braking. Some larger or more complex airplanes contain additional stopping devices such as spoilers and thrust reversers, but these devices are not always included on many airplanes. Smaller aircraft must rely on pressing the toe brakes to hydraulically push the brake pads against the brake disk. The friction can cause the brake pads to wear down faster when excessive braking is used. Also these brakes can be subject to failure under extreme conditions due to heat or warping.

The present invention provides a solution for the requirements of short stopping distance to supplement or serve as backup should the main braking system fail or is not actuated properly by the operator. The present invention uses a wheel braking interface and an at least one speed limiting module to slow the vehicle. It provides an added measure of safety that can be activated by the pilot or operator when necessary and adds an extra amount of safety when stopping distance is limited or conditions are extreme. The present invention serves as a supplement to normally installed brake systems and can be engaged when required either manually by the operator, automatically by speed sensors, or remotely by a computer or computing device to prevent excess speeds or a runaway vehicle. The present invention provides an added measure of safety by supplementing brake systems that are subject to failure. The automotive, trucking, rail, and aviation community will benefit greatly from the present device. The present invention does not interfere with the operation of the main braking system and can be used in conjunction with current anti-lock systems.

BRIEF DESCRIPTION OF THE DRAWINGS

FIG. 8b is a side sectional view of the present invention along line B-B shown in FIG. 8a.

DETAIL DESCRIPTIONS OF THE INVENTION

All illustrations of the drawings are for the purpose of describing selected versions of the present invention and are not intended to limit the scope of the present invention.

The present invention is a braking system for supplemental or emergency to be used alongside and/or in conjunction with traditional braking methods of vehicles. The braking system for supplemental or emergency use allows for increased resistance in addition to the traditional braking method to slow the rotation of the wheel assembly of the vehicle. The resistance to rotation allows the vehicle to stop within a shorter distance and quicker than a traditional braking interface, such as disc and drum brakes. The braking system for supplemental or emergency use is adaptable to automotive, trucking, locomotive, or aerial vehicles.

Figure 1:
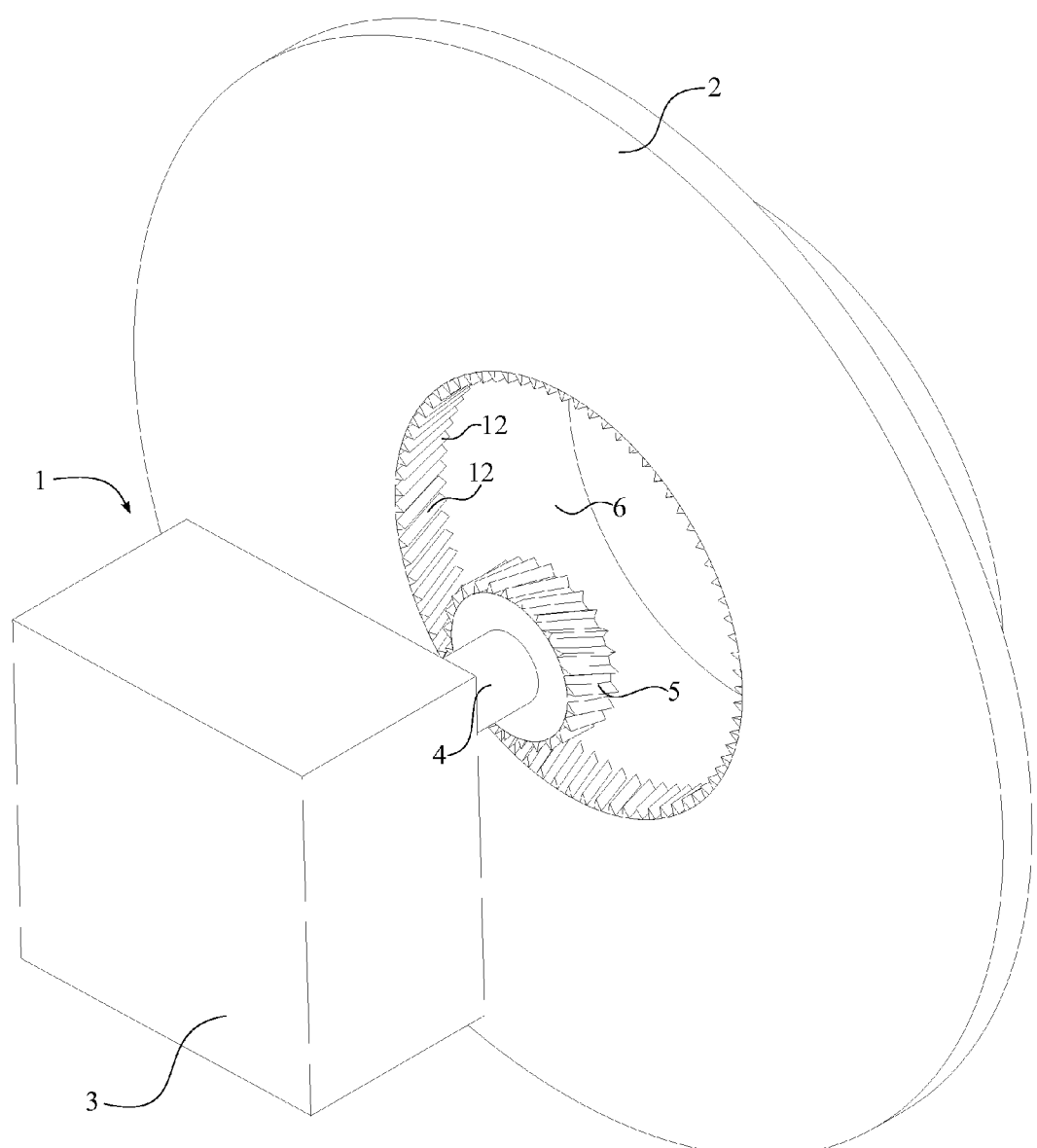
FIG. 1 is a perspective view of the present invention.
Figure 2:
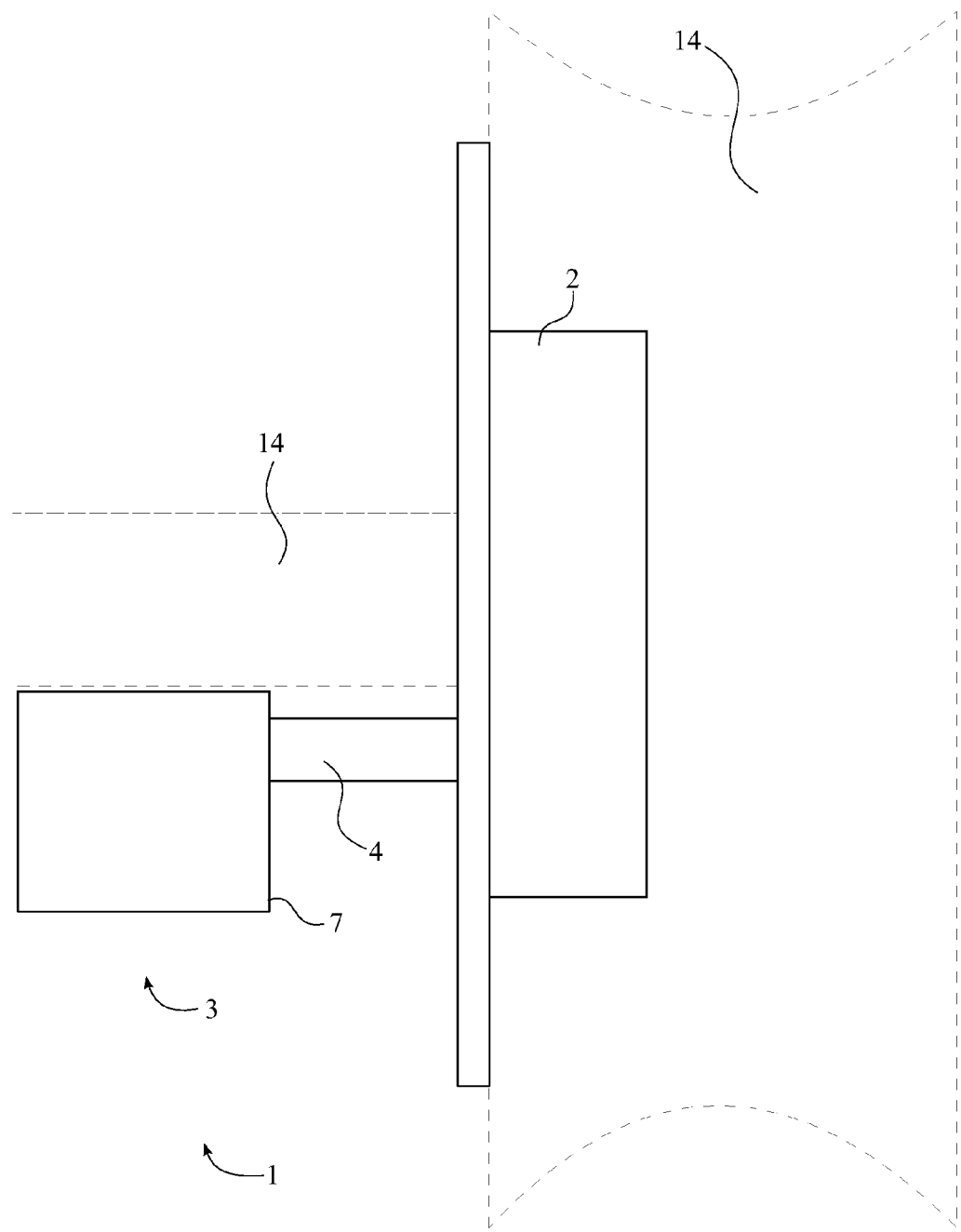
FIG. 2 is a side view of the present invention as mounted within an existing wheel assembly.
Figure 8A:
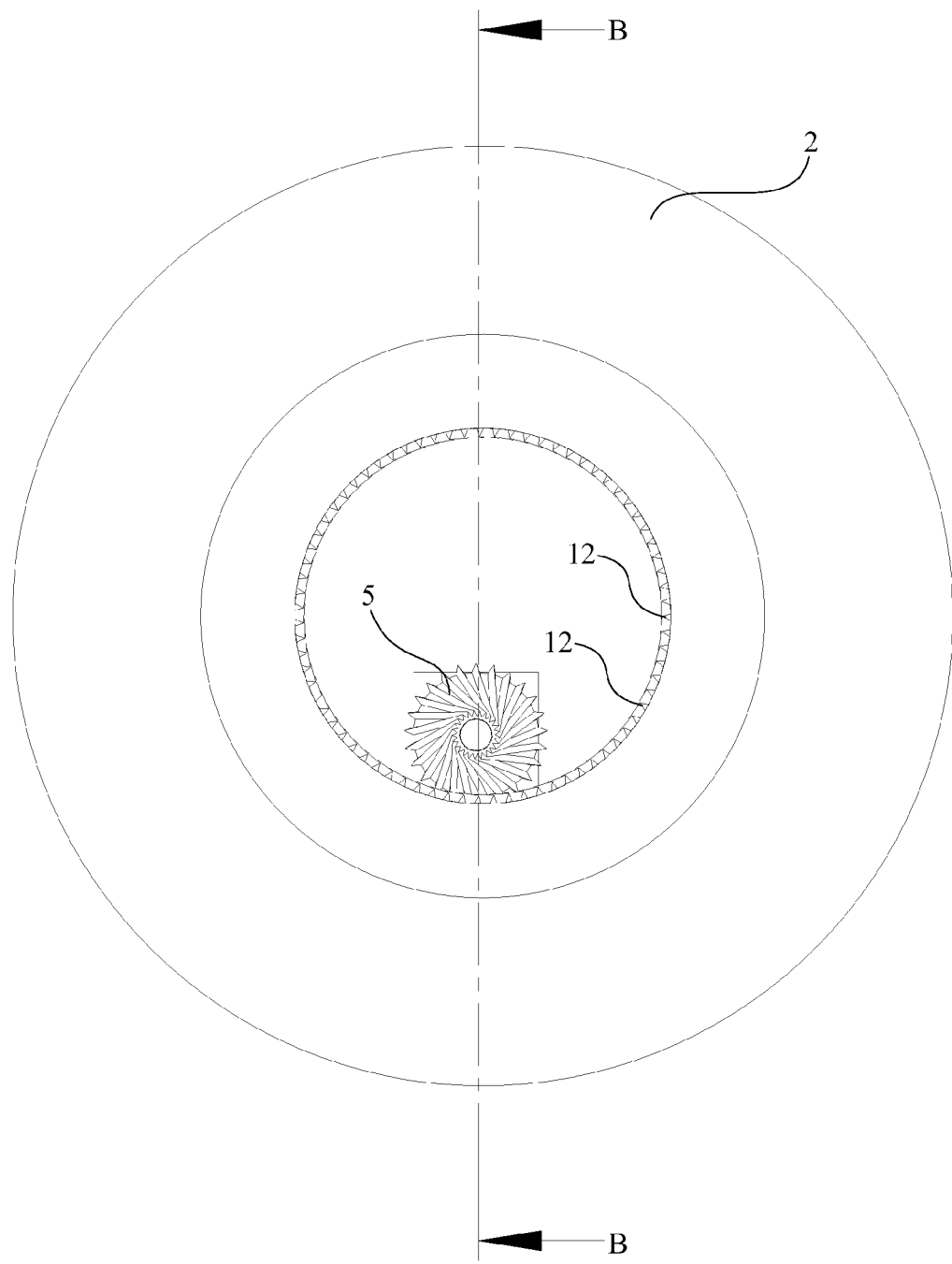
FIG. 8a is a front elevational view of the present invention
Figure 8B:
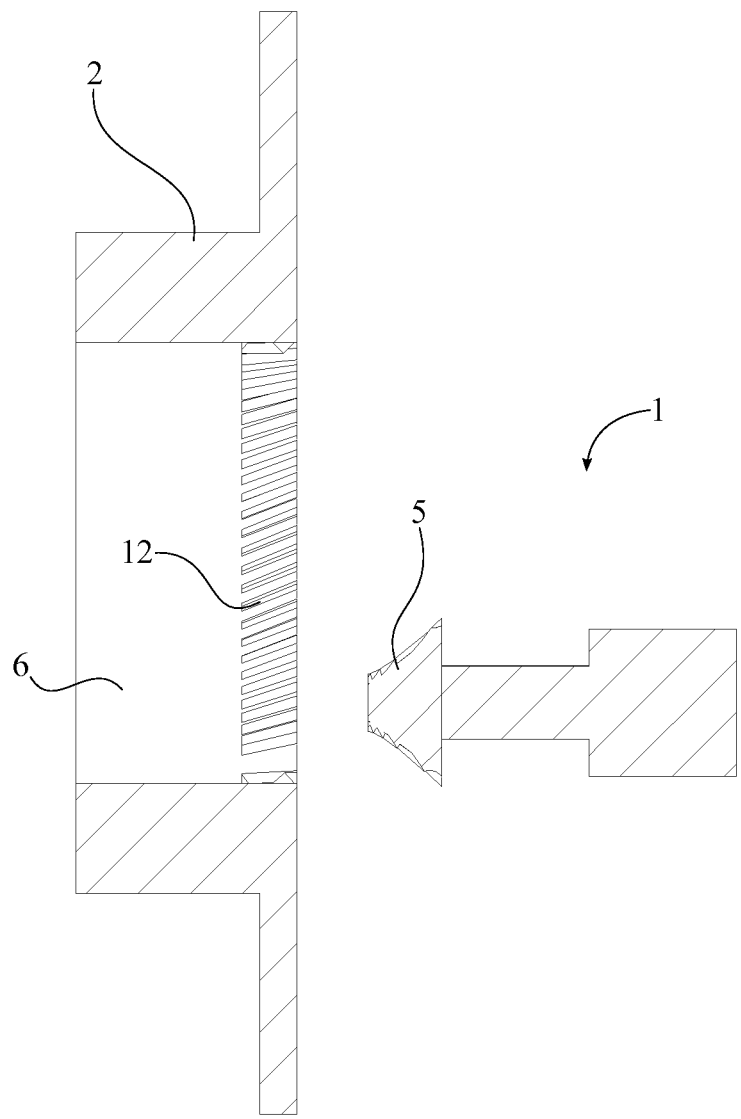
Figure 9:
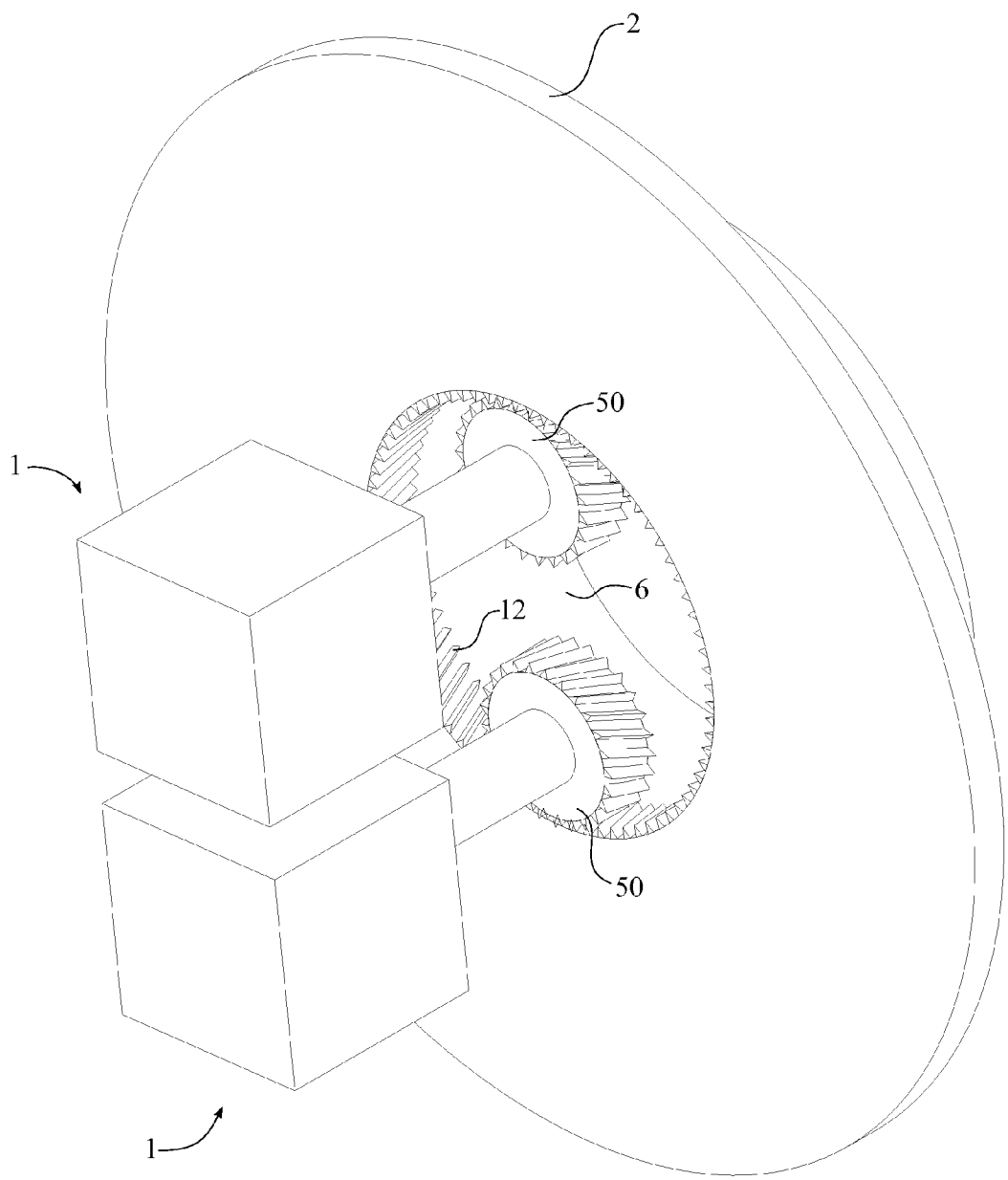
FIG. 9 is a perspective view of a two gear and speed limiter module configuration of an alternate embodiment of the present invention.

As illustrated in FIG. 1 and FIG. 2, the braking system for supplemental or emergency use comprises at least one speed limiting module 1 and a wheel braking interface 2. The at least one speed limiting module 1 increases the resistance on the wheel braking interface 2 to slow the existing wheel assembly 14 of the vehicle. The wheel braking interface 2 includes but is not limited to a disc rotor or a braking drum, which the wheel of the vehicle is mounted upon. The at least one speed limiting module 1 comprises a controller unit 3, a gear shaft 4, and a pinion 5, in accordance to FIG. 6. The controller unit 3 adjusts the amount of resistance applied onto the wheel braking interface 2 while the pinion 5 is used to apply the resistance to the wheel braking interface 2. The gear shaft 4 connects and translates the resistive force from the controller unit 3 to the pinion. The wheel braking interface 2 comprises an internal annular wall 6 and a plurality of internal cogs 12, as depicted in FIG. 1, FIG. 8b and FIG. 9. The internal annular wall 6 defines a cavity of the wheel braking interface 2 which the plurality of internal cogs 12 is positioned about. The plurality of internal cogs 12 allows for a surface which the pinion 5 interfaces with to provide the increased resistance to the wheel braking interface 2. In accordance to FIG. 3, the controller unit 3 comprises a variable rotational resistance (VRR) mechanism 8. The VRR mechanism includes but is not limited to flyweights, fluids, springs, abrade-able materials, or similar resistance mechanisms and is able to be modularly constructed and is easily disposed of or replaced for ease of maintenance. The VRR mechanism 8 is fixed within the controller unit 3 to control the amount of resistance to place on the gear shaft 4. The gear shaft 4 is rotatably and adjacently connected to the VRR mechanism 8. The pinion 5 is axially and adjacently connected to the gear shaft 4, opposite the VRR mechanism 8 and oriented perpendicular to the gear shaft 4. The internal annular wall 6 is radially positioned about a rotational axis of the wheel braking interface 2. The plurality of internal cogs 12 is radially connected around the internal annular wall 6 and the pinion 5 is positioned within the internal annular wall 6, adjacent to the plurality of internal cogs 12. The pinion 5 is enmeshed with the plurality of internal cogs 12 to transfer the resistive force from the VRR mechanism 8 to the wheel braking interface 2.

Figure 3:
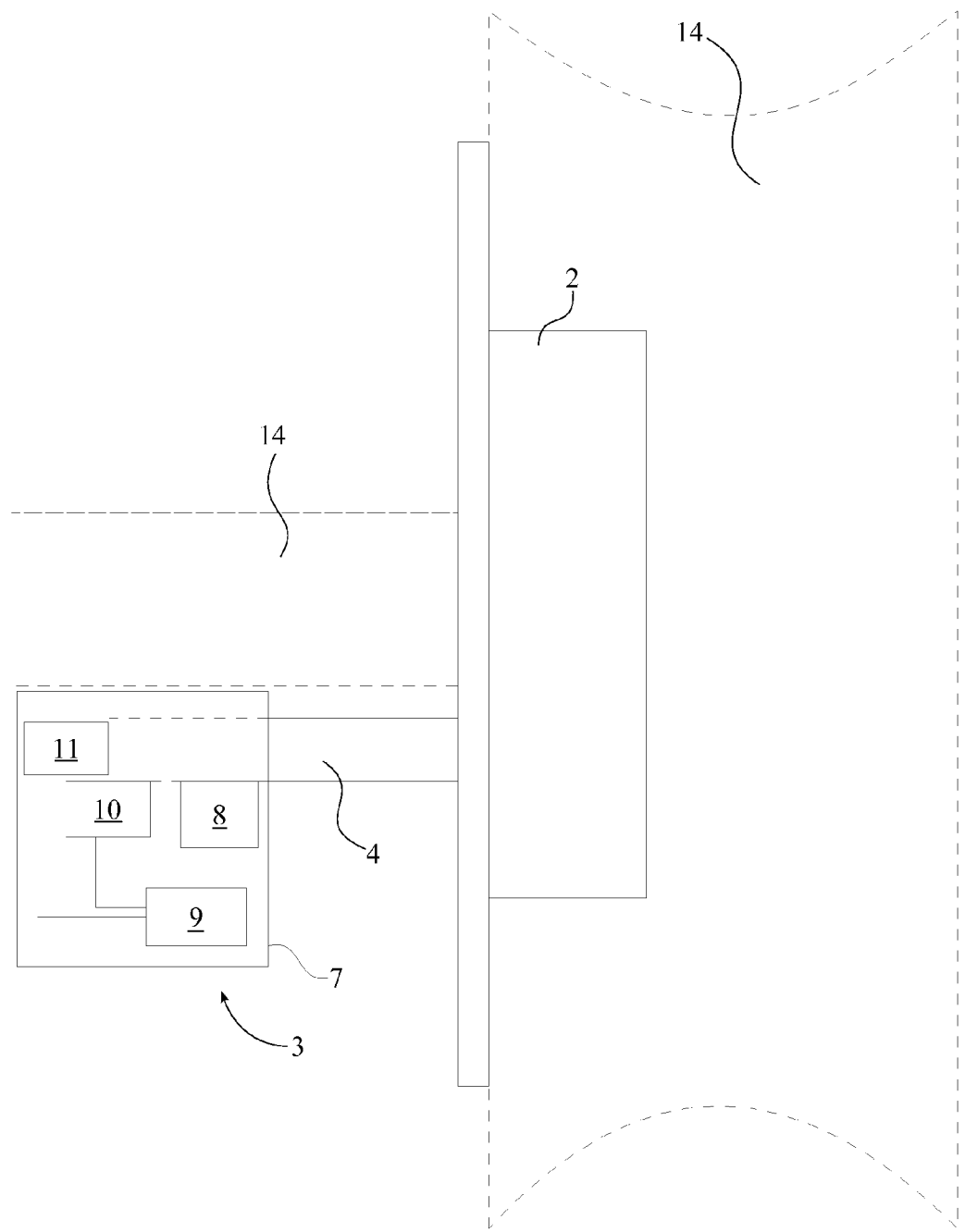
FIG. 3 is a side view of the present invention showing a embodiment of the electrical components in a general arrangement of the present invention as mounted within an existing wheel assembly.
Figure 4:
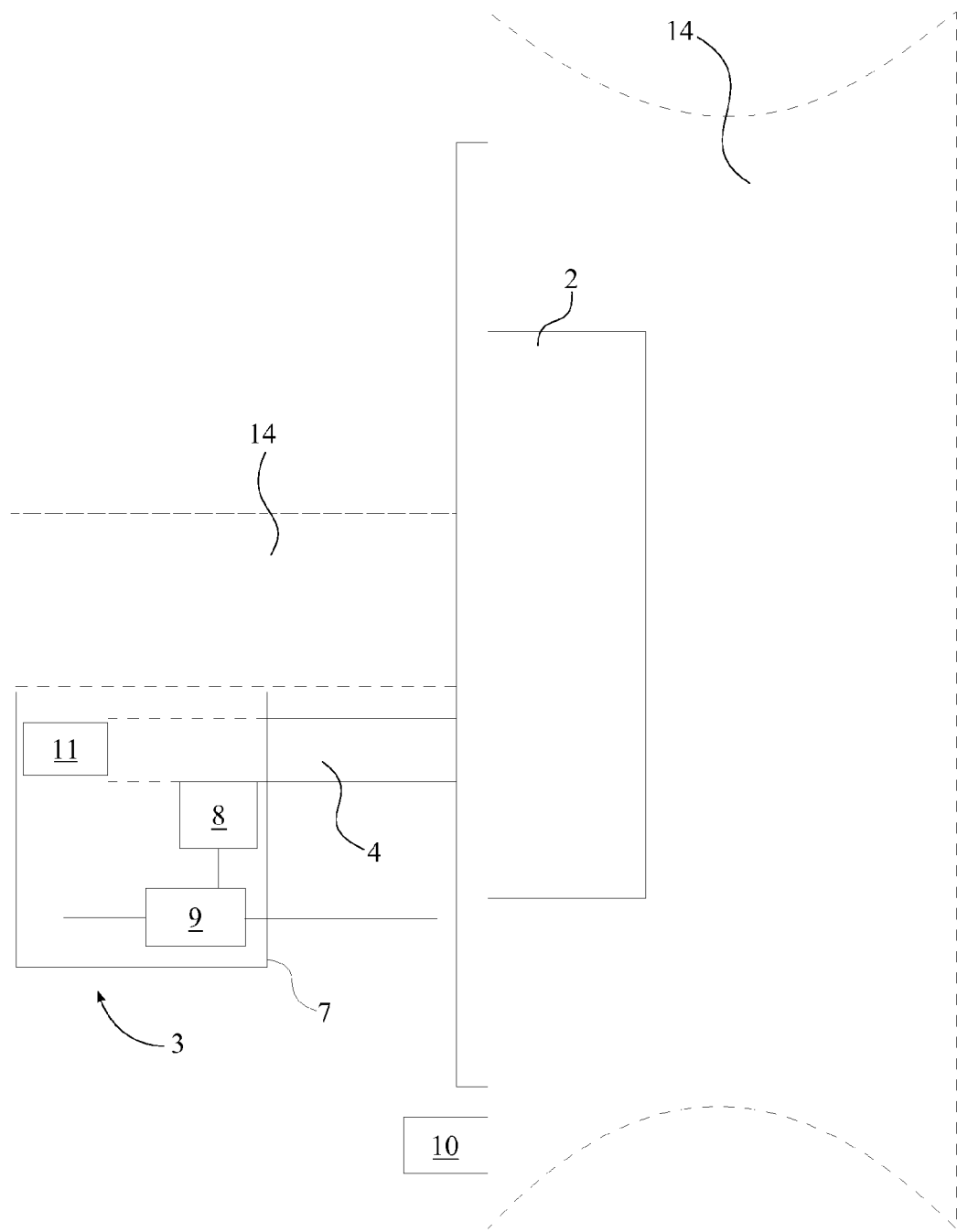
FIG. 4 is a side view of the present invention showing an alternate embodiment of the electrical components in a general arrangement of the present invention, as mounted within an existing wheel assembly.

As shown in FIG. 3, the controller unit 3 further comprises a controller housing 7, a chipset 9, and an angular velocity sensor 10. The chipset 9 includes subroutines which control the resistance to be placed onto the gear shaft 4 by the VRR mechanism 8. The angular velocity sensor 10 is incorporated to determine the speed of the rotation of the wheel braking interface 2 or the gear shaft 4. The angular velocity sensor 10 provides an electrical input of the speed to the chipset 9 that allows the chipset 9 to determine the necessary amount of resistance to apply for the VRR mechanism 8. The angular velocity sensor 10 is laterally mounted about the gear shaft 4, when assessing the rotational speed of the gear shaft 4. In an alternate embodiment, the angular velocity sensor 10 is laterally mounted about the wheel assembly 14 of the vehicle, where the angular velocity sensor 10 is used to determine the rotational speed of the wheel braking interface 2, as shown in FIG. 4. The chipset 9 is mounted within the controller housing 7 and electronically connected to the VRR mechanism 8 where the chipset 9 provides an input which controls the resistance applied by the VRR mechanism 8. The angular velocity sensor 10 is similarly electronically connected to the chipset 9 where the chipset 9 receives an input of the rotational speed of the gear shaft 4 or wheel braking interface 2. The chipset includes a transmission module, such that the present invention is able to be actuated remotely from a remote device or monitoring and control facility.

Figure 5:
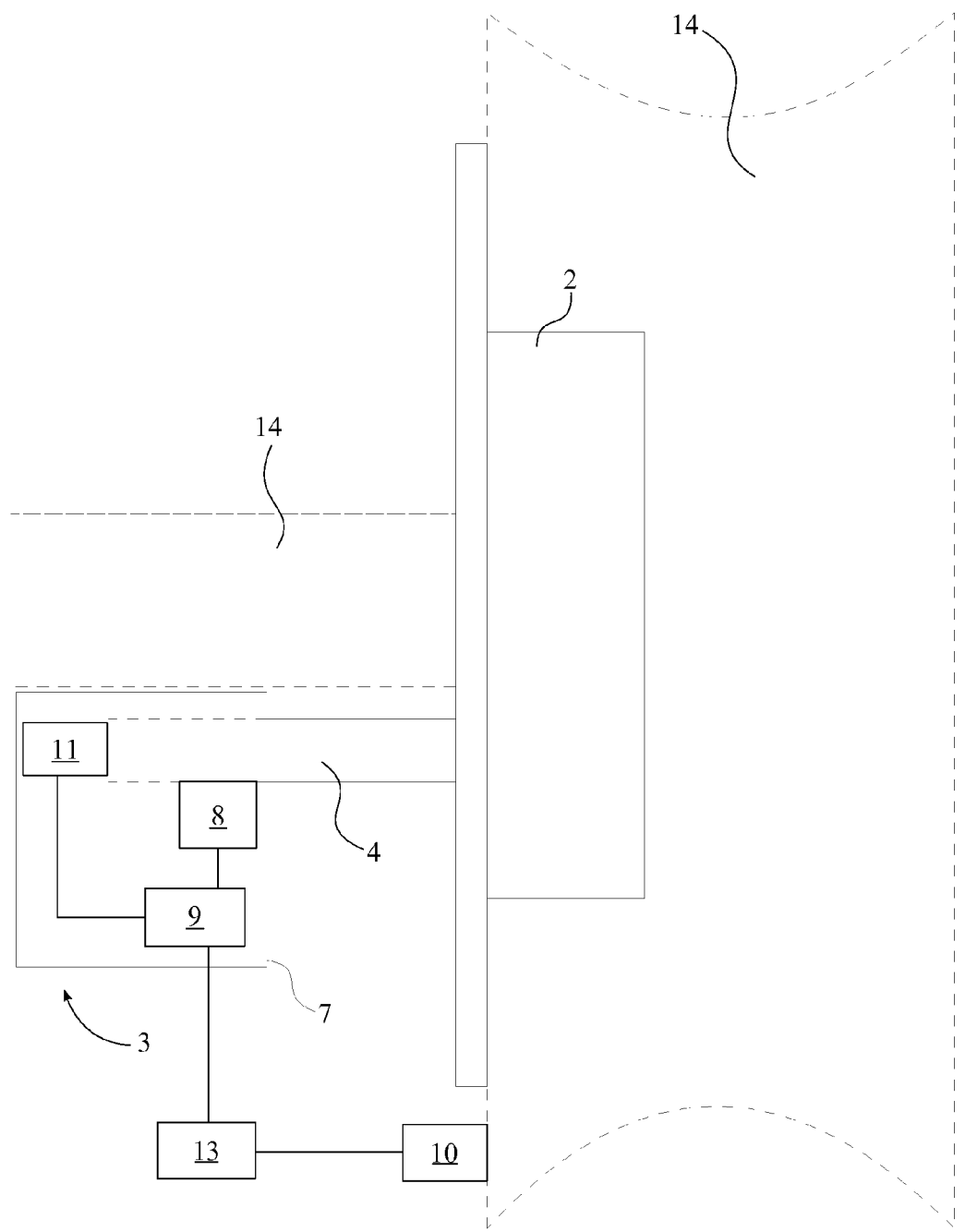
FIG. 5 is a side view of the present invention showing yet another alternate embodiment of the electrical components in a general arrangement of the present invention as mounted within an existing wheel assembly.

In yet another alternate embodiment and in accordance to FIG. 5, the angular velocity sensor 10 is electronically and indirectly connected to the chipset 9 through an electronic computing unit (ECU) 13, for vehicles which include an ECU 13. In this embodiment, the rotational speed is determined by the angular velocity sensor 10 and transmitted to the ECU 13. From the ECU 13, a corresponding electronic signal is transmitted to the chipset 9 to determine the input to the VRR mechanism 8 to slow the rotation of the wheel braking interface 2.

In the preferred embodiment of the present invention, the controller unit 3 further comprises a retraction mechanism 11, as detailed in FIG. 3 to FIG. 5. The retraction mechanism 11 allows for the translation of the gear shaft 4 between two positions; an engaged position and a disengaged position. In the engaged position the gear shaft 4 is positioned such that the pinion 5 is enmeshed with the plurality of internal cogs 12. In the disengaged position the gear shaft 4 is positioned such that the pinion 5 is removed from the plurality of internal cogs 12; allowing the wheel braking interface 2 to rotate unhindered by the at least one speed limiting module 1. The chipset 9 is electronically connected to the retraction mechanism 11. The retraction mechanism 11 is operatively coupled to the gear shaft 4, such that the retraction mechanism 11 is used to translate the gear shaft 4 along its axis of rotation. The pinion 5 is therefore selectively and slideably engaged to the plurality of internal cogs 12. When the chipset 9 receives a signal to slow the rotation of the wheel braking interface 2, the gear shaft 4 extends from the controller housing 7 such that the pinion 5 engages the plurality of internal cogs 12. When the wheel is slowed enough, stopped, or the emergency braking system is no longer needed, the pinion 5 is disengaged from the plurality of internal cogs 12 either from the chipset 9 assessing the speed of rotation of the wheel braking interface 2 or the operator of the vehicle inputting the signal to disengage the system. When the pinion 5 is disengaged, the gear shaft 4 recedes into the controller housing 7 by means of the retraction mechanism 11.

Figure 10:
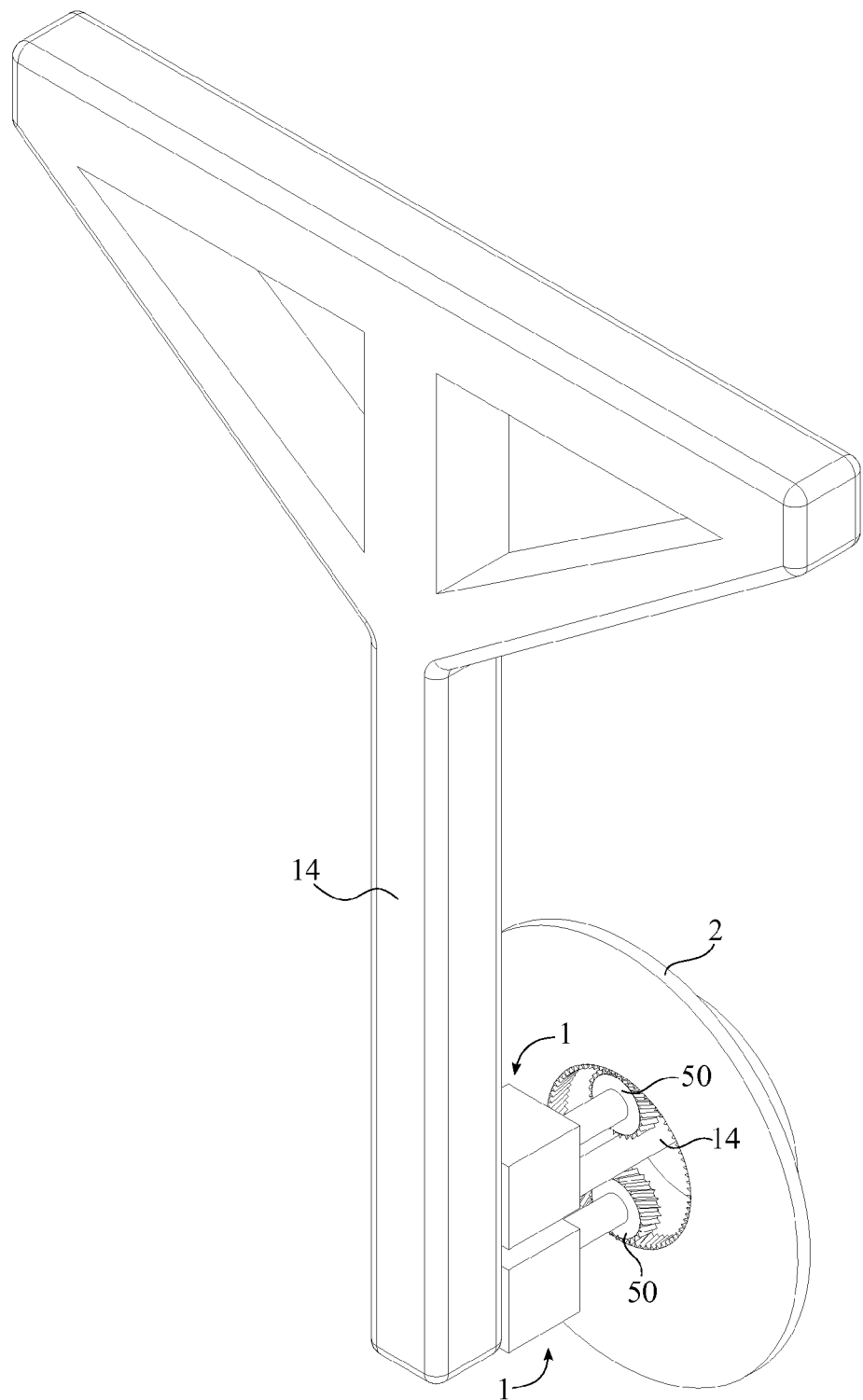
FIG. 10 is a perspective view of one embodiment of the present invention, wherein the embodiment includes a plurality of speed limiting modules mounted on an existing wheel assembly, which includes a strut.

In still another alternate embodiment, the at least one speed limiting module 1 is a plurality of speed limiting modules, wherein the plurality of speed limiting modules comprises a plurality of pinions 50. The plurality of pinions 50 is positioned equidistantly around the internal annular wall 6. When the plurality of pinions 50 comprises two pinions, as shown in FIG. 9 and FIG. 10, the two pinions are diametrically opposed to each other along the internal annular wall 6. When the plurality of pinions 50 comprises greater than two pinions, the plurality of pinions 50 is equiangularly positioned about the internal angular wall 6 with respect to each other, with the axis of rotation of the wheel braking interface 2 being the vertex of the angles.

Figure 6:
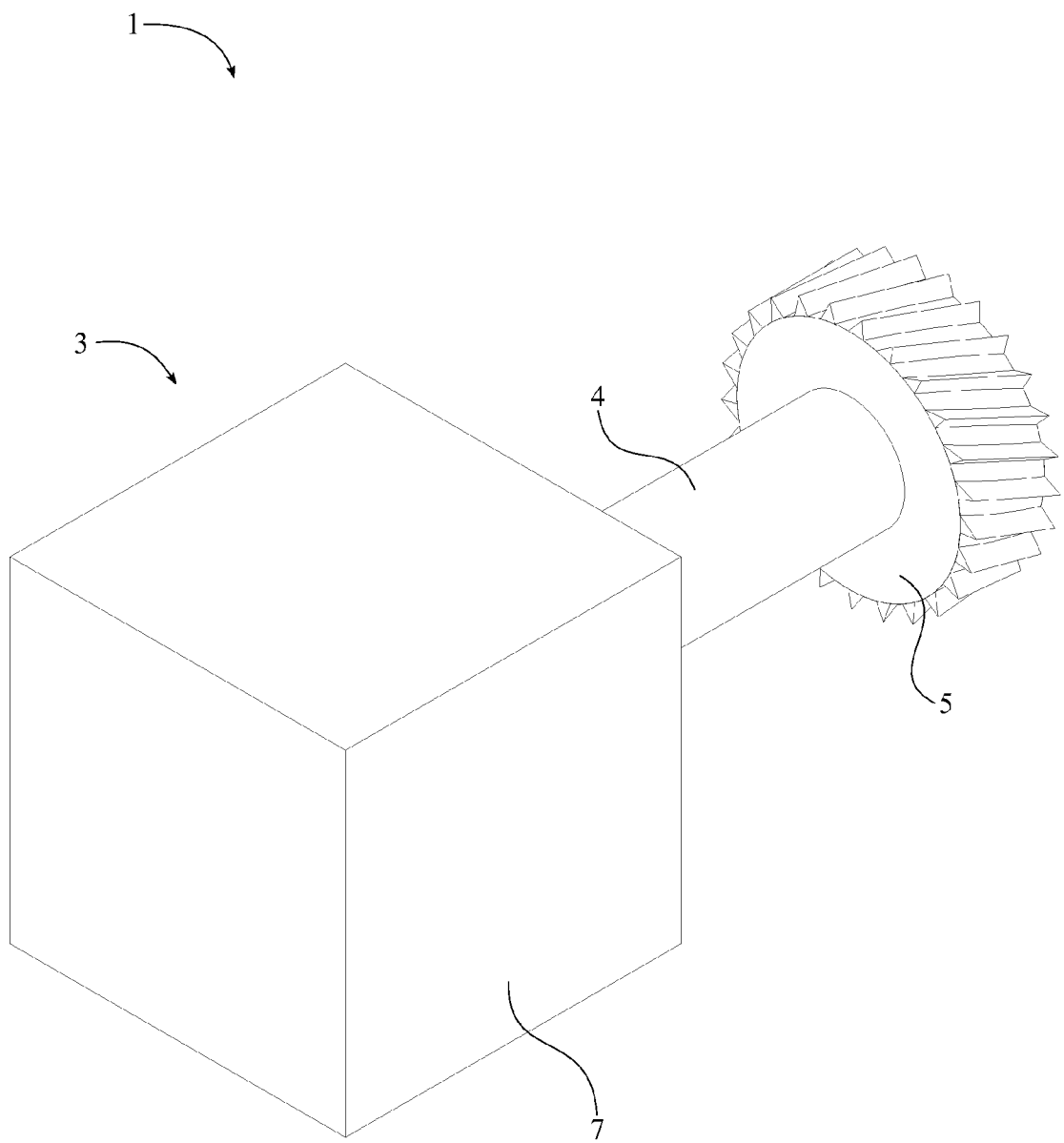
FIG. 6 is detailed view of the speed limiting module of the present invention.
Figure 7:
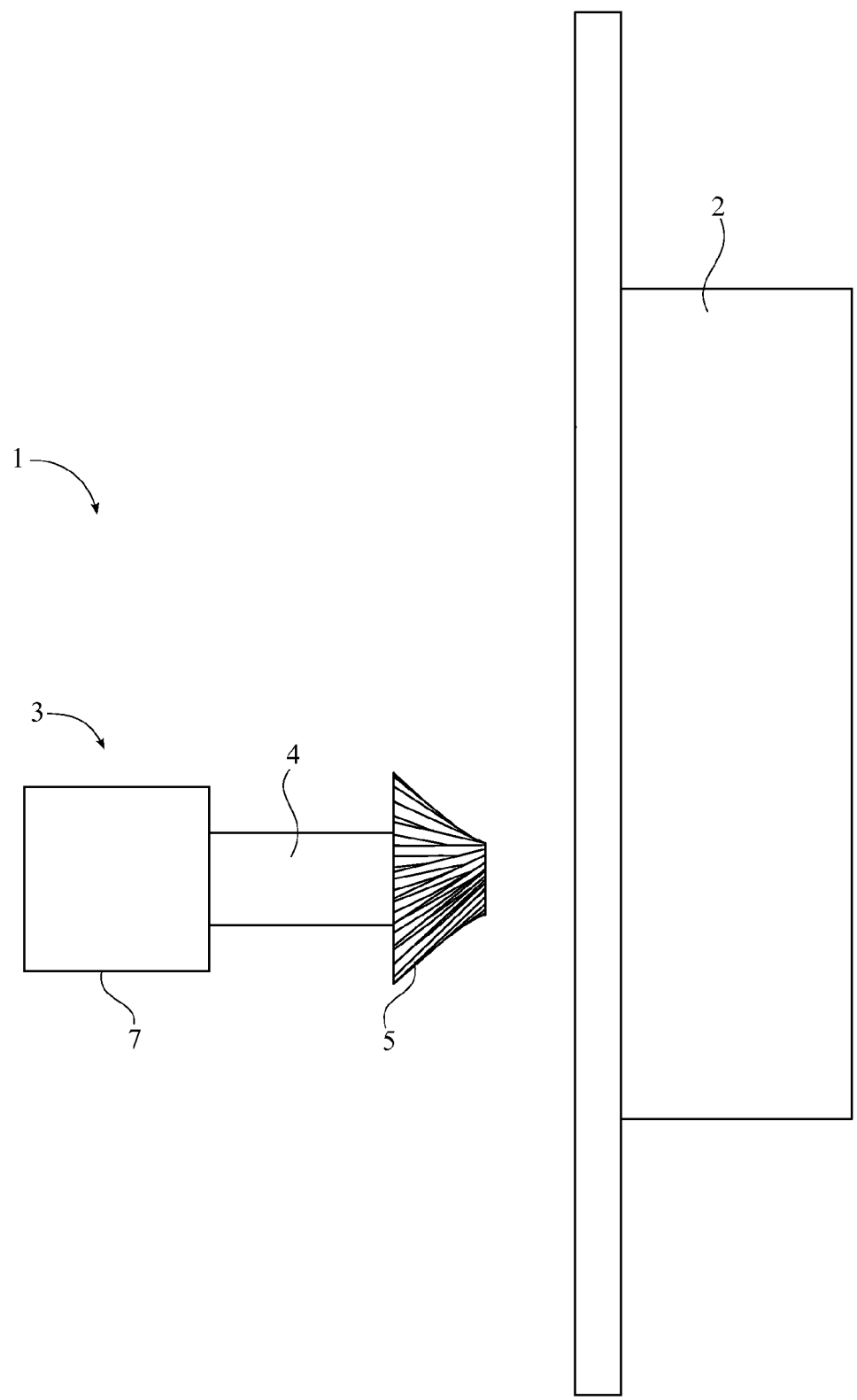
FIG. 7 is a side view of an alternate embodiment of the present invention with a beveled pinion disengaged from the wheel braking interface.

The pinion 5 of the present invention may take several forms depending on the application of the present invention and vehicle the present invention is integrated with. In an exemplary embodiment, the pinion 5 of the present invention is a cylindrical gear with a first set of straight-cut teeth parallel to the axis of rotation, as depicted in FIG. 6. The plurality of internal cogs 12 is a second set of straight teeth, which mesh with the first set of straight cut teeth of the pinion 5. In another exemplary embodiment, the pinion 5 of the present invention is a cylindrical gear with a first set of helical teeth which mesh with the plurality of internal cogs 12 being a second set of helical teeth. In an alternate embodiment to each of these exemplary embodiments, the pinion 5 is a bevel gear with a first set of straight-cut teeth or a first set of helical teeth, respectively. The embodiment of the bevel gear with the first set of helical teeth is depicted in FIG. 7.

Although the invention has been explained in relation to its preferred embodiment, it is to be understood that many other possible modifications and variations can be made without departing from the spirit and scope of the invention as hereinafter claimed.

What is claimed is:
1. A braking system for supplemental or emergency use comprises:
an at least one speed limiting module;
a wheel braking interface;
the at least one speed limiting module comprises a controller unit, a gear shaft, and a pinion;
the wheel braking interface comprises an internal annular wall and a plurality of internal cogs;
the controller unit comprises a variable rotational resistance (VRR) mechanism;
the VRR mechanism being fixed within the controller unit;
the gear shaft being rotatably and adjacently connected to the VRR mechanism;
the pinion being axially and adjacently connected to the gear shaft, opposite to the VRR mechanism;
the pinion being oriented perpendicular to the gear shaft;

the internal annular wall being radially positioned about a rotation axis of the wheel braking interface;
the plurality of internal cogs being radially connected around the internal annular wall;
the pinion being positioned within the internal annular wall; and
the pinion being enmeshed with the plurality of internal cogs.

2. The braking system for supplemental or emergency use as claimed in claim 1 comprises:
the controller unit further comprises a controller housing, a chipset, and an angular velocity sensor;
the angular velocity sensor being laterally mounted about the gear shaft;
the chipset being mounted within the controller housing;
the chipset being electronically connected to the VRR mechanism; and
the angular velocity sensor being electronically connected to the chipset.

3. The braking system for supplemental or emergency use as claimed in claim 1 comprises:
the controller unit further comprises a controller housing, a chipset, and an angular velocity sensor;
the angular velocity sensor being laterally mounted about a wheel assembly, wherein a vehicle includes the wheel assembly;
the chipset being mounted within the controller housing;
the chipset being electronically connected to the VRR mechanism; and
the angular velocity sensor being electronically connected to the chipset.

4. The braking system for supplemental or emergency use as claimed in claim 3 comprises:
the angular velocity sensor being electronically and indirectly connected to the chipset through an electronic computing unit (ECU), wherein a mode of transportation includes the ECU.

5. The braking system for supplemental or emergency use as claimed in claim 1 comprises:
the controller unit further comprises a chipset and a retraction mechanism;
the chipset being electronically connected to the retraction mechanism;
the retraction mechanism being operatively coupled to gear shaft, wherein the retraction mechanism is used to translate the gear shaft along its rotation axis; and
the pinion being selectively and slideably engaged to the plurality of internal cogs.

6. The braking system for supplemental or emergency use as claimed in claim 1 comprises:
the at least one speed limiting module being a plurality of speed limiting modules;
the plurality of speed limiting modules comprises a plurality of pinions; and
the plurality of pinions being positioned equidistantly around the interior annular wall.

7. The braking system for supplemental or emergency use as claimed in claim 1 comprises:
the pinion being a cylindrical gear with a first set of straight-cut teeth; and
the plurality of internal cogs being a second set of straight-cut teeth.

8. The braking system for supplemental or emergency use as claimed in claim 1 comprises:
the pinion being a cylindrical gear with a first set of helical teeth; and
the plurality of internal cogs being a second set of helical teeth.

9. The braking system for supplemental or emergency use as claimed in claim 1 comprises:
the pinion being a bevel gear with a first set of straight-cut teeth; and
the plurality of internal cogs being a second set of straight-cut teeth.

10. The braking system for supplemental or emergency use as claimed in claim 1 comprises:
the pinion being a bevel gear with a first set of helical teeth; and
the plurality of internal cogs being a second set of helical teeth.

11. A braking system for supplemental or emergency use system comprises:
an at least one speed limiting module;
a wheel braking interface;
the at least one speed limiting module comprises a controller unit, a gear shaft, and a pinion;
the wheel braking interface comprises an internal annular wall and a plurality of internal cogs;
the controller unit comprises a variable rotational resistance (VRR) mechanism, a chipset and a retraction mechanism;
the VRR mechanism being fixed within the controller unit;
the gear shaft being rotatably and adjacently connected to the VRR mechanism;
the pinion being axially and adjacently connected to the gear shaft, opposite to the VRR mechanism;
the pinion being oriented perpendicular to the gear shaft;
the internal annular wall being radially positioned about a rotation axis of the wheel braking interface;
the plurality of internal cogs being radially connected around the internal annular wall;
the pinion being positioned within the internal annular wall;
the pinion being enmeshed with the plurality of internal cogs;
the chipset being electronically connected to the retraction mechanism;
the retraction mechanism being operatively coupled to gear shaft, wherein the retraction mechanism is used to translate the gear shaft along its rotation axis; and
the pinion being selectively and slideably engaged to the plurality of internal cogs.

12. The braking system for supplemental or emergency use as claimed in claim 11 comprises:
the controller unit further comprises a controller housing, a chipset, and an angular velocity sensor;
the angular velocity sensor being laterally mounted about the gear shaft;
the chipset being mounted within the controller housing;
the chipset being electronically connected to the VRR mechanism; and
the angular velocity sensor being electronically connected to the chipset.

13. The braking system for supplemental or emergency use as claimed in claim 11 comprises:
the controller unit further comprises a controller housing, a chipset, and an angular velocity sensor;
the angular velocity sensor being laterally mounted about a wheel assembly, wherein a vehicle includes the wheel assembly;
the chipset being mounted within the controller housing;
the chipset being electronically connected to the VRR mechanism; and the angular velocity sensor being electronically connected to the chipset.

14. The braking system for supplemental or emergency use as claimed in claim 13 comprises:
the angular velocity sensor being electronically and indirectly connected to the chipset through an electronic computing unit (ECU), wherein a mode of transportation includes the ECU.

15. The braking system for supplemental or emergency use as claimed in claim 11 comprises:
the at least one speed limiting module being a plurality of speed limiting modules;
the plurality of speed limiting modules comprises a plurality of pinions; and
the plurality of pinions being positioned equidistantly around the interior annular wall.

16. The braking system for supplemental or emergency use as claimed in claim 11 comprises:
the pinion being a cylindrical gear with a first set of straight-cut teeth; and
the plurality of internal cogs being a second set of straight-cut teeth.

17. The braking system for supplemental or emergency use as claimed in claim 11 comprises:
the pinion being a cylindrical gear with a first set of helical teeth; and
the plurality of internal cogs being a second set of helical teeth.

18. The braking system for supplemental or emergency use as claimed in claim 11 comprises:
the pinion being a bevel gear with a first set of straight-cut teeth; and
the plurality of internal cogs being a second set of straight-cut teeth.

19. The braking system for supplemental or emergency use as claimed in claim 11 comprises:
the pinion being a bevel gear with a first set of helical teeth; and
the plurality of internal cogs being a second set of helical teeth.

* * * * *